United States Patent Office 3,178,469
Patented Apr. 13, 1965

3,178,469
CARBOXYARYLPHOSPHONATES
Ellis K. Fields, Chicago, Ill., assignor to Standard Oil Company, Chicago, Ill., a corporation of Indiana
No Drawing. Filed July 19, 1962, Ser. No. 211,120
8 Claims. (Cl. 260—461)

This invention relates to organophosphorus compounds and particularly to carboxyarylphosphonic acids and novel esters thereof.

It has been discovered that aroyl peroxides react with organic phosphites to give carboxyarylphosphonates in good yields. While carboxyarylphosphonic acids are known, the carboxyarylphosphonates obtained in accordance with this invention are new compounds. The reaction can be illustrated as follows:

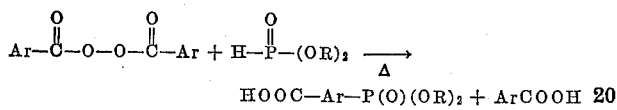

HOOC—Ar—P(O)(OR)₂ + ArCOOH

The novel compounds of this invention are carboxy-substituted arylphosphonates having the formula HOOC—Ar—P(O)(OR)₂ wherein Ar is a divalent aromatic radical and R is a hydrocarbyl radical containing 1 to about 30 carbon atoms preferably selected from the group consisting of alkyl, cycloalkyl, aralkyl and aryl radicals. These new compounds are useful as chemical intermediates. For example, these new phosphonates can be hydrolyzed by conventional techniques to the corresponding carboxyarylphosphonic acids. They are also useful per se, or as metal or ammonium or substituted ammonium salts, such as sodium, potassium, copper, molybdenum or trimethylammonium salts, as pesticides, additives for hydrocarbon fuels and lubricants, as surfactants, and detergents. They also react wtih monohydric and polyhydric alcohols, phenols, etc. to form esters useful as plasticizers.

Known methods for the preparation of carboxyarylphosphonic acids are inapplicable for preparation of carboxy-substituted arylphosphonates. Generally, such methods have employed chemical oxidants such as potassium permanganate or chromic oxidants for the conversion of alkyl substituents on the aromatic ring of arylphosphonic acids to the desired carboxylic acid group. Attempts to preferentially oxidize alkyl substituents on aromatic ring of alkylarylphosphonates to the desired carboxyl group and thus obtain carboxy-substituted arylphosphonates have been unsuccessful for complete oxidation of the phosphorous esters occurs. For example, oxidation of diethyl 4-methylphenylphosphonate yields only 4-carboxyphenylphosphonic acid. Carboxyphenylphosphonic acids obtainable by hydrolysis of carboxyphenylphosphonates prepared in accordance with this invention have otherwise been prepared by reaction of diazo derivatives of benzoic acid with phosphorus trichloride. For example, there is described in the Journal of the American Chemical Society, 73, 5658 (1951), the preparation of p-carboxyphenylphosphonic acid by the reaction of phosphorus trichloride with the diazonium fluorborate of benzoic acid. It has been found that such methods utilizing expensive chemical reactants and a number of steps are too costly for the commercial preparation of carboxyphenylphosphonic acid. Further, there is no known technique for esterifying the phosphonic acid group without concomitant esterification of the carboxyl group. Consequently, carboxyarylphosphonates have been unknown prior to this invention.

The carboxyarylphosphonates are prepared by reacting an aroyl peroxide and a phosphite at a temperature of from about 80° to about 160° C., preferably 125 to 140° C. The reaction is preferably effected by incrementally adding the aroyl peroxide to liquid phosphite at reaction temperature in molar ratio of 1:1 to about 1:10 aroyl peroxide to phosphite. Alternatively, the reactants can be admixed at temperatures below 50° C. and then very slowly heated to reaction temperatures. Inasmuch as the peroxide is thermally decomposed to free radicals under the reaction conditions it is preferable to add the peroxide in small amounts to reaction mixture and thereby obtain maximum yields of carboxyarylphosphonates with minimum formation of byproducts. The phosphite serves as the reaction medium so a mutual solvent for the reactants is not required except when very high boiling phosphites are used. When a solvent is required, it should be inert and non-aromatic because free radical reactants tend to react with solvent.

The aroyl peroxides suitable for use in this invention can be represented by the formula

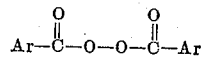

wherein Ar is a mononuclear or polynuclear aromatic nucleus which can be unsubstituted or contain unreactive substituents such as halogen, nitro, or alkoxy and alkyl groups containing from 1 to about 20 carbon atoms. The aromatic nucleus must have at least one unsubstituted position, preferably in para-position for benzoyl peroxide, to effect coupling of aromatic nucleus with the phosphonyl radical. Illustrative aroyl peroxides are benzoyl peroxide, alpha and beta naphthoylperoxides, phenanthroyl peroxide, and anthroyl peroxide. The preferred aroyl peroxide is benzoyl peroxide having the formula

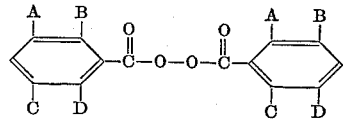

wherein A, B, C and D are each selected from the group consisting of hydrogen, halogen, nitro, alkoxy or alkyl radicals containing from 1 to about 20 carbons. Such peroxides can be prepared in known manner from corresponding unsubstituted or substituted aromatic acids.

The phosphite reactants are diesters of phosphorous acid having the formula H–P(O)(OR)₂ wherein R is a hydrocarbyl radical, unreactive with peroxide, containing from 1 to about 30 carbon atoms selected from the group consisting of alkyl, cycloalkyl, aryl and aralkyl radicals. Illustrative phosphites are dimethyl phosphite, diethyl phosphite, dibutyl phosphite, dioctyl phosphite, dioctadecyl phosphite, ditetracosyl phosphite, ditriacontyl phosphite, dicyclohexyl phosphite, dicyclooctyl phosphite, diphenyl phosphite, dinaphthyl phosphite, diphenethyl phosphite, dibenzyl phosphite.

Illustrative embodiments of the invention are presented in the following examples:

*Example 1*

To 128 ml. (1 mole) diethyl phosphite stirred at 135° C. in a flask equipped with stirrer and reflux condenser was added 96 g. (0.396 mole) benzoyl peroxide in small portions over 70 minutes. Formation of low-boiling materials reduced the reaction temperature to 128° C. After 15 minutes refluxing, the mixture was distilled, giving 19 ml. benzene and recovering 76.7 g. (0.55 mole) diethyl phosphite, boiling at 41–42° C. at 0.35 mm., $n_D^{20}$ 1.4085. Above 100° C. at 0.7 mm. benzoic acid began to distill; 10.4 g. was collected, then distillation was discontinued. The distillation residue was taken up in 300 ml. ether and the ether solution extracted with 5% aqueous NaOH until the extracts were alkaline. The aqueous alkaline extract was acidified, precipitating an orange, syrupy layer. The syrup was dissolved in a mixture of 25 ml. ethanol and 75 ml. i-propyl ether, filtered and evaporated on the steam bath with nitrogen blowing to remove all traces of benzoic acid, giving 28 g. (55% yield) of product as a viscous orange liquid identified as diethyl p-carboxyphenyl phosphonate. *Analysis.*—Calculated for $C_{11}H_{15}PO_5$: C, 51.2; H, 5.8; P, 12.0; acid number 217. Found: C, 51.1; H, 6.0; P, 12.1; acid number 213.

A portion was refluxed for 18 hours with concentrated hydrochloric acid, then evaporated on the steam bath. The residue was taken up in water, treated with charcoal, filtered, and concentrated. On cooling, a while solid formed that melted at 371° C. A mixed melting point of 373° C. was obtained with a sample of p-carboxyphenyl phosphonic acid (M.P. 375° C.), prepared by the method of G. O. Doak and L. D. Freedman, J. Am. Chem. Soc. 73, 5658 (1951). Alternatively, hydrolysis of the phosphonate can be effected without previous isolation.

*Example II*

To 97.6 ml. (0.5 mole) dibutyl phosphite stirred at 135° C. was added 61 g. (0.25 mole) benzoyl peroxide in small portions over 30 minutes. After addition was complete the mixture was kept at 135° C. for 20 minutes, then distilled. Benzene, 7.4 g., came over first; 40 g. (0.21 mole) dibutyl phosphite, boiling at 80–102° C. at 1.1 mm. were recovered, and 6.3 g. benzoic acid solidified in the condenser. The distillation residue was dissolved in 200 ml. ether and extracted with 5% aqueous NaOH. The aqueous alkaline extract was acidified. The precipitated oil taken up in 250 ml. ether, washed three times with water, and evaporated on the steam bath with nitrogen blowing to remove all benzoic acid. The residue was a very viscous yellow oil, $n_D^{20}$ 1.5108, 44.8 g. (57% yield) identified as dibutyl p-carboxyphenyl phosphonate. *Analysis.*—Calculated for $C_{15}H_{23}PO_5$: C, 57.4; H, 7.3; P, 9.9. Found: C, 57.0; H, 7.7; P, 10.2. The sodium salt of the dibutyl p-carboxyphenyl phosphonate of this example was found to have excellent surfactant and detergent properties.

It will be apparent to those skilled in the art that this invention provides a novel, simple and convenient method for the preparation of novel compounds, namely carboxyarylphosphonates and of carboxyarylphosphonic acids therefrom.

Thus having described the invention, what is claimed is:

1. The method which comprises reacting (*a*) an aroyl peroxide and (*b*) a phosphite having the formula $HP(O)(OR)_2$ wherein R is hydrocarbyl containing from 1 to about 30 carbon atoms of the group consisting of alkyl, cycloalkyl, aralkyl and aryl in the molar ratio of peroxide to phosphite of from about 1:1 to 1:10 at a temperature of from about 80° C. to about 160° C.; and recovering from the reaction mixture a compound having the formula $HOOC—Ar—P(O)(OR')_2$ wherein Ar is the aromatic nucleus of said aroyl peroxide and R' is selected from the group consisting of hydrogen and R.

2. The method of claim 1 wherein R is alkyl containing from 1 to about 30 carbon atoms.

3. The method of claim 1 wherein said aroyl peroxide is benzoyl peroxide.

4. The method of claim 2 wherein said alkyl is ethyl.

5. The method of claim 2 wherein said alkyl is butyl.

6. The method comprising reacting (*a*) benzoyl peroxide with (*b*) a dialkyl phosphite having 1 to about 30 carbon atoms in each alkyl in the molar ratio of said peroxide to said phosphite of from about 1:1 to about 1:10 at a temperature between about 125° C. and about 140° C. for a period of from about 0.5 to about 4 hours; and separating dialkyl p-carboxyphenyl phosphonate from the reaction mixture.

7. The method of claim 6 wherein said phosphite is dibutyl phosphite and said phosphonate is dibutyl p-carboxyphenyl phosphonate.

8. The method of claim 6 wherein said phosphite is dibutyl phosphite and said phosphonate is dibutyl p-car boxyphenyl phosphonate.

References Cited in the file of this patent
UNITED STATES PATENTS
2,776,985    McKinnis _____ Jan. 8, 1957

OTHER REFERENCES

Freedman et al.: "J. Am. Chem. Soc.," vol. 77, pp. 920–921 (1955).

Fields et al.: "Chemistry and Industry," No. 31, July 30, 1960, pp. 999–1000.

UNITED STATES PATENT OFFICE
CERTIFICATE OF CORRECTION

Patent No. 3,178,469                      April 13, 1965

Ellis K. Fields

It is hereby certified that error appears in the above numbered patent requiring correction and that the said Letters Patent should read as corrected below.

Column 4, line 29, for "dibutyl", each occurrence, read -- diethyl --.

Signed and sealed this 17th day of August 1965.

(SEAL)
Attest:

ERNEST W. SWIDER
Attesting Officer

EDWARD J. BRENNER
Commissioner of Patents